(12) United States Patent
Sun et al.

(10) Patent No.: US 8,657,917 B2
(45) Date of Patent: *Feb. 25, 2014

(54) METHOD FOR RECYCLING METALS FROM WASTE MOLYBDIC CATALYSTS

(75) Inventors: Yu-Lung Sun, Kaohsiung (TW);
Ming-Zhe Tsai, Koahsiung (TW);
Yung-Hao Liu, Kaohsiung (TW)

(73) Assignee: Hong Jing Metal Corporation, Kaohsiung (TW)

( * ) Notice: Subject to any disclaimer, the term of this patent is extended or adjusted under 35 U.S.C. 154(b) by 306 days.

This patent is subject to a terminal disclaimer.

(21) Appl. No.: 13/166,202

(22) Filed: Jun. 22, 2011

(65) Prior Publication Data

US 2012/0279354 A1    Nov. 8, 2012

(30) Foreign Application Priority Data

May 6, 2011    (TW) .............................. 100115998 A

(51) Int. Cl.
| | |
|---|---|
| *C10M 175/00* | (2006.01) |
| *C22B 7/00* | (2006.01) |
| *C22B 23/00* | (2006.01) |
| *C22B 34/22* | (2006.01) |
| *C22B 3/08* | (2006.01) |
| *C22B 59/00* | (2006.01) |

(52) U.S. Cl.
USPC .................. 75/743; 75/416; 423/53; 423/68; 423/132; 423/150.2

(58) Field of Classification Search
USPC .............. 75/743, 416; 423/53, 68, 150.2, 132
See application file for complete search history.

(56) References Cited

U.S. PATENT DOCUMENTS

| | | | |
|---|---|---|---|
| 4,350,609 A | | 9/1982 | Cronauer et al. |
| 4,657,745 A | * | 4/1987 | Hyatt .............................. 423/53 |
| 4,861,565 A | * | 8/1989 | Sefton et al. .................... 423/55 |
| 5,431,892 A | | 7/1995 | Toyabe et al. |

FOREIGN PATENT DOCUMENTS

| | | |
|---|---|---|
| CN | 1557978 A | 12/2004 |
| CN | 101824533 A | 9/2010 |

* cited by examiner

*Primary Examiner* — George Wyszomierski
*Assistant Examiner* — Tima M McGuthry Banks
(74) *Attorney, Agent, or Firm* — Muncy, Geissler, Olds & Lowe, P.C.

(57) ABSTRACT

A method for recycling metals from waste molybdic catalysts, comprises steps of leaching, by soaking a waste molybdic catalyst into a highly oxidized acid and conducting a reaction between sulfur in the waste molybdic catalyst and the acid to obtain sulfide and vaporizer, wherein metals in the waste molybdic catalyst are dissolved and oxidized by the acid to obtain a first solution and dregs; and refining, by further dissolving metals in the dregs into a second solution, and extracting metals in the waste molybdic catalyst from the first and second solution; wherein, the vaporizer obtained from the step of leaching is converted into highly oxidized acid and recycled in the step of leaching.

17 Claims, 3 Drawing Sheets

METHOD FOR RECYCLING METALS FROM WASTE MOLYBDIC CATALYSTS

BACKGROUND OF THE INVENTION

1. Field of the Invention

The present invention relates to a method for recycling metals from waste catalysts, particularly to a method for recycling metals from waste molybdic catalysts by using a highly oxidized acid.

2. Description of the Related Art

In oil-refining industry, catalysts, particular to RDS (residual desulfurization) catalyst and HDS (hydrodesulfurization) catalyst have been widely used in hydro-desulphurization processes. Both of the RDS catalyst and the HDS catalyst have a carrier of alumina, with the carrier of alumina to immobilize metals, for example vanadium, molybdenum or nickel, or metallic oxides on its surfaces. Accordingly, the effects of the RDS catalyst or HDS catalyst are easy to be ineffective due to the contamination and absorption of mass iron or phosphorus during catalysis process. Therefore, a great amount of waste catalysts are generated during the processes of oil-refining, and which may lead to serious pollutions or ecological crisis if a proper treatment of those waste catalysts has not been gone through.

In frankly, the waste catalysts, including waste RDS catalyst and HDS catalyst, are rich in metals, such as molybdenum, nickel, even aluminum obtained from the surfaces of the carrier of alumina, and those metals are capable of being recycled and reused in industries. With such propose, it is a need of providing a method for recycling metals from waste catalysts, for the sake of obtaining a dramatic amount of metals from the waste catalysts and further applying recycled metals in diverse industries.

A conventional technique for recycling metals from waste catalysts as disclosed in China Patent No. CN1557978A and entitled "PRODUCTION TECHNOLOGY FOR EXTRACTING VANADIUM AND MOLYBDENUM FROM SPENT ALUMINUM BASE MOLYBDENUM CATALYZER USING WET METHOD" comprises steps of roasting, by sodium-roasting aluminum base molybdenum catalyzer at 950-1050° C. for 2-3 hours; and leaching, by recycling vanadium and molybdenum from the aluminum base molybdenum catalyzer.

However, a high temperature (more than 950° C.) is needed in the step of roasting of the conventional technique, and therefore it is costly and wasteful in use of energy. Furthermore, sulfur or sulfide in the aluminum base molybdenum catalyzer are easy to diffuse through the processes under the high temperature of the step of roasting, leading to serious contamination and pollutions on air or water resource. Also, nickel in aluminum base molybdenum catalyst is uneasy to be recycled via the sodium-roasting process, so that the efficiency of the conventional technique for recycling metals from waste catalysts is quite low and inconvenient.

Another conventional technique for recycling metals from waste catalyst is disclosed in China Patent No. CN1328396C and entitled "METHOD FOR EXTRACTING VANADIUM, MOLYBDENUM, NICKEL, COBALT, ALUMINUM FROM WASTE ALUMINUM BASE CATALYST," in which, aluminum catalysts are roasted at 600-900° C. for 0.5-2 hours, soaked in 80-90° C. hot water, and then further soaked in sulfuric acid to recycle nickel and cobalt and to obtain a residue after recycling. Moreover, vanadium and molybdenum can also be recycled from the residue by adding barium hydroxide or barium aluminate into the residue to generate sodium aluminate solution, and sequentially isolating vanadium and molybdenum from the sodium aluminate solution. In this way, the recycling rate of metals in aluminum catalyst will achieve 91%.

Although the conventional technique above can effectively recycled metals from aluminum catalyst, sulfur or sulfide in aluminum catalyst will still remain in the aluminum catalysts and result in contamination and pollutions on air or water resource. Moreover, an additional oxidization of vanadium and molybdenum is needed for extracting vanadium and molybdenum from the aluminum catalysts, and however, the oxidization of vanadium and molybdenum may increase the impurity thereof and diminish the recycling rate of vanadium and molybdenum as well.

Additionally, there is a great amount of aluminum remained in the aluminum catalysts, with the result in interfering with the recycling of vanadium, nickel and molybdenum from the aluminum catalysts. In conventional arts, aluminum in the aluminum catalysts are additionally recycled by aerating carbon dioxide into the sodium aluminate solution, followed by roasting the sodium aluminate solution at a high temperature to obtain alumina. In this situation, the recycled metals only can be obtained in a time-and-cost consuming process, with poor quality and low recycling rate. It is suggested that, the conventional techniques has plenty of disadvantages and inconvenience, and therefore there is an urgent need of improving the conventional technique for recycling metals from waste catalysts.

SUMMARY OF THE INVENTION

The primary objective of this invention is to provide a method for recycling metals from waste molybdic catalysts, which can effectively remove sulfur and sulfide from the waste molybdic catalysts so as to avoid pollutions caused by the contamination of sulfur or sulfide.

The secondary objective of this invention is to provide a method for recycling metals from waste molybdic catalysts, which can directly recycle metals in oxidization state from the waste molybdic catalysts, so that the difficulty of recycling processes will be reduced but the recycling rate of metals will be promoted.

Another objective of this invention is to provide a method for recycling metals from waste molybdic catalysts, which can avoid negative effects caused by aluminum during the recycling of metals so as to improve the quality of recycled metals.

Another objective of this invention is to provide a method for recycling metals from waste molybdic catalysts, which can directly obtain metallic dregs in oxidization state from the waste molybdic catalysts, so that a higher recycling rate of metals can be achieved in a time-and-cost saving process.

Another objective of this invention is to provide a method for recycling metals from waste molybdic catalysts, which can directly recycle oxidized dianions obtained from a reaction between sulfur in waste molybdic catalysts and acid, so as to be significantly frugal in acid use.

A method for recycling metals from waste molybdic catalysts comprises steps of leaching, by soaking a waste molybdic catalyst into a highly oxidized acid and conducting a reaction between sulfur in the waste molybdic catalyst and the acid to obtain sulfide and vaporizer, wherein metals in the waste molybdic catalyst are dissolved and oxidized by the acid to obtain a first solution and dregs; and refining, by further dissolving metals in the dregs into a second solution, and extracting metals in the waste molybdic catalyst from the first and second solution; wherein, the vaporizer obtained from the step of leaching is converted into highly oxidized acid and recycled in the step of leaching.

Further scope of the applicability of the present invention will become apparent from the detailed description given hereinafter. However, it should be understood that the detailed description and specific examples, while indicating preferable embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
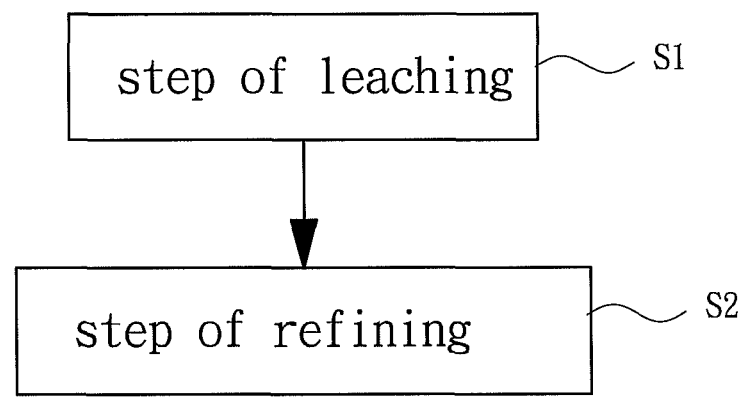
FIG. 1 is a diagram illustrating a first embodiment of a method for recycling metals from waste molybdic catalysts in the present invention.

All figures are drawn for ease of explaining the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions conforming to specific force, weight, strength, and similar requirements will likewise be within the skill of the art after the following teachings of the present invention have been read and understood. Furthermore, when the term "first", "second" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 2:
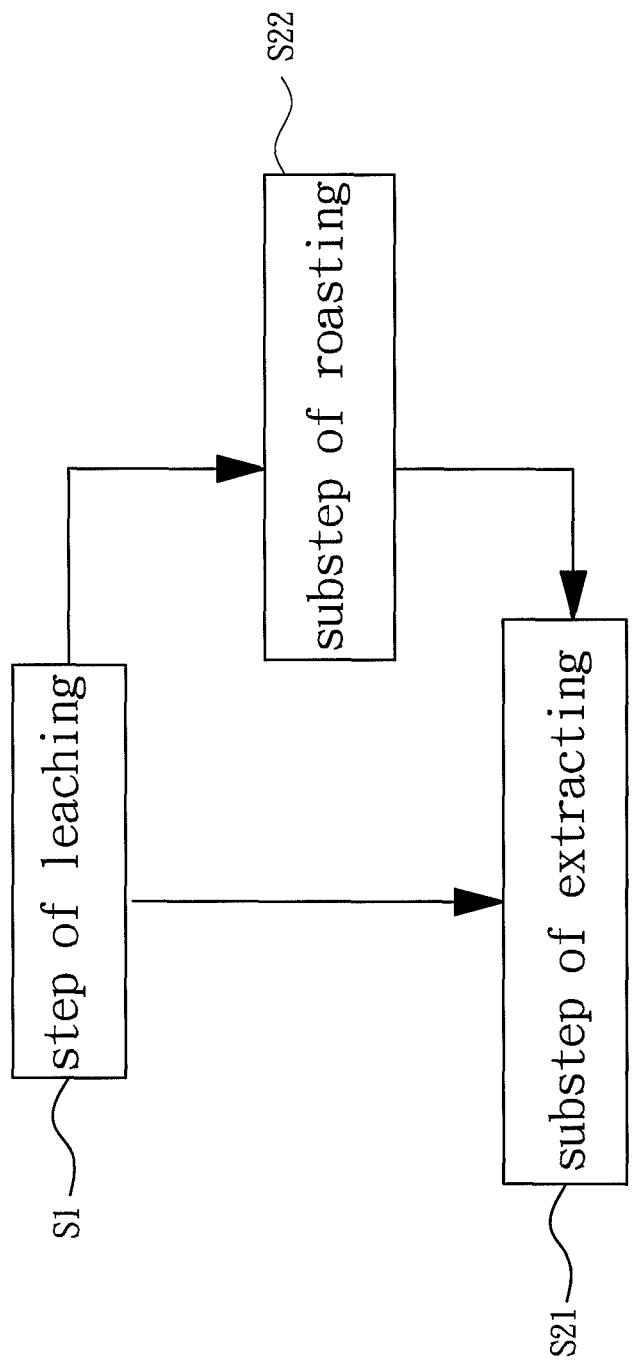
FIG. 2 is a diagram illustrating a step of leaching in a method for recycling metals from waste molybdic catalysts of the present invention.

In accordance with FIGS. 1 and 2, a first embodiment of a method for recycling metals from waste molybdic catalysts in the present invention is shown and comprises a step of "leaching S1," and a step of "refining S2," wherein, in the step of "refining S2," products obtained from the step of "leaching S1," are processed via a substep of "extracting S21," or via substeps of "roasting S22," and "extracting S21," due to the characteristics of the products, for the sake of completely recycling metals from the waste molybdic catalysts.

The waste molybdic catalysts of the present invention can be any waste catalysts obtained from a hydro-desulphurization unit, for example waste RDS catalyst, HDS catalyst or a mix of RDS catalyst and HDS catalyst, and which is rich in molybdenum, nickel, aluminum, sulfur or sulfide obtained from the hydro-desulphurization unit, and other possible metals in accordance with various waste catalysts. As an example, waste RDS catalyst is selected and used in the preferable embodiment of the present invention.

In the step of "leaching S1," a waste molybdic catalyst is prepared and soaked into a highly oxidized acid to conduct a reaction between sulfur in the waste molybdic catalyst and the acid, in order to obtain sulfide and vaporizer. In this situation, metals in the waste molybdic catalyst are dissolved and oxidized by the acid to generate a first solution and dregs, wherein both of the first solution and the dregs comprise metallic oxides. Furthermore, the vaporizer obtained from the step of "leaching S1" can be converted into acid and recycled in the step of "leaching S1".

More precisely, the waste molybdic catalyst contains various compositions of metals selected from a group of vanadium, molybdenum, nickel, aluminum, and sulfur or sulfide obtained from the hydro-desulphurization. Accordingly, sulfur in the waste molybdic catalyst will completely interact with the acid to generate the sulfide and the vaporizer. Moreover, the sulfide will increase the acidity of the acid so that the dissolution of metals in the waste molybdic catalyst can be promoted. Also, the vaporizer of the present invention is oxidized dianions, which is capable of being converted into acid and recycled in the present invention.

At the mean time, metals, such as vanadium, molybdenum, nickel, and rare aluminum, in the molybdic waste catalyst are dissolved in the acid to obtain the first solution, which has a plenty amount of vanadium, molybdenum, nickel but rare aluminum. On the other hand, residual metals in the waste molybdic catalysts, particular to aluminum, are remained and became the dregs which are solid and contain a significant amount of aluminum and rare vanadium, molybdenum and nickel. Then, vanadium, molybdenum, nickel, aluminum, and a slight amount of sulfur either in the first solution or in the dregs are completely oxidized by the acid to generate vanadium oxide and molybdenum oxide and sulfur dioxide. The vanadium oxide and molybdenum oxide will be easy to be extracted in the next steps. Also, the sulfur dioxide has higher vaporization point, and which is less possible to diffuse through the processes of the step of "refining S2". In the present embodiment, the acid can be nitric acid, hydrochloric acid, nitrous acid, sulfuric acid, hypochlorous acid, chlorous acid, perchloride acid.

With reference of REACTIONS 1 and 2, being an example of the present embodiment, waste RDS catalyst is prepared and soaked into 5-40% of nitric acid for 2 to 4 hours, with a weight ratio of nitric acid and waste RDS catalyst being 1-4, and then, a reaction between sulfur in the waste RDS catalyst and nitric acid is conducted to generate sulfuric acid and vapored $NO_3^-$. Generally, the waste RDS catalyst collected from various batches of hydro-desulphurization processes contains metals in diverse ratios, for example the waste RDS catalyst used as the example of the present embodiment comprising 22.4% of aluminum, 3.2% of molybdenum, 2.5% of nickel, 7.6% of vanadium, and sulfur or sulfide. With such arrangement, the vapored $NO_3^-$ obtained from the said reaction can be collected via an air-extracting apparatus, so as to be recycled and further used in the step of "leaching S1" of the present invention. Furthermore, a solution contained a great amount of vanadium oxide, molybdenum oxide, nickel oxide but rare alumina oxide, and dregs contained rare amount of vanadium oxide, molybdenum oxide, nickel oxide but a great amount of alumina oxide, are obtained, wherein the solution and the dregs can be further processed respectively via different processes in the step of "refining S2" due to their different characteristics.

$$HO\text{---}NO_2 + 2H_2SO_4 \rightarrow NO_2^+ + 2H_2SO_4^- + H_3O^+ \quad \text{REACTION 1}$$

$$NO_2^+ + H_2O \rightarrow HNO_3 \quad \text{REACTION 2}$$

In the step of "refining S2," metallic oxides in the dregs are dissolved into a solvent at first to obtain a second solution, followed by extracting metals of waste molybdic catalysts from the first and second solution. More specifically, vanadium, molybdenum, nickel and aluminum in the first solution can be directly isolated and obtained from the first solution via an extraction method. Yet, metallic oxides, including vanadium oxide, molybdenum oxide, nickel oxide and alumina oxide, in dregs need to be sodium-roasted and dissolved into the second solution, and then to be isolated from the second solution via the said extraction method. In this way, vanadium, molybdenum, nickel and a large amount of aluminum can be successfully obtained from the dregs in a preferable efficiency.

With reference to FIG. 2, the step of "refining S2" further comprises substeps of "extracting S1;" and "roasting S22". In the substep of "extracting S1," a large amount of vanadium, molybdenum, nickel and a small amount of aluminum are extracted and obtained from the first solution by processes of: providing an extraction solvent, an alkaline solvent and an acid solvent; extracting vanadium and molybdenum by the extraction solvent to obtain a first extract; with the performance of the alkaline solvent further extracting vanadium and molybdenum from the first extract to obtain a second extract, recycling vanadium and molybdenum from the second extract, and obtaining a residue after recycling; extracting aluminum from the residue with the performance of the extraction solvent to obtain a third extract, and further extracting aluminum from the third extract with the performance of the acid solvent, and obtaining a leftover after extracting; and finally extracting nickel directly from the leftover. In the substep of "roasting S2," the dregs obtained from the step of "leaching S1" and alkaline powders are mixed and roasted at 300-800° C., preferably at 600-700° C., for 1 hour to obtained ripening dregs, followed by soaking the ripening dregs into hot water to obtain the second solution. Next, vanadium, molybdenum, nickel, and aluminum of the dregs are extracted from the second solution via the said processes of the substep of "extracting S21" above.

In the present embodiment, the extraction solvent can be N-235, alamine 336, aliquot 306, P204, P507, N236, TOA, or their combination; the alkaline solvent can be sodium chloride, sodium carbonate or sodium hydroxide; the acid solvent can be nitric acid, sulfuric acid, hydrochloric acid or phosphoric acid; and alkaline powders can be sodium carbonate, sodium hydroxide or sodium chloride.

With such arrangement, the recycling rate of vanadium, molybdenum and nickel from the first solution can reach to 70-95%. Moreover, a great amount of aluminum, and residual vanadium, molybdenum and nickel are also recycled from the dregs via the substeps of "roasting S22" and "extracting S1" of the present invention.

Figure 3:
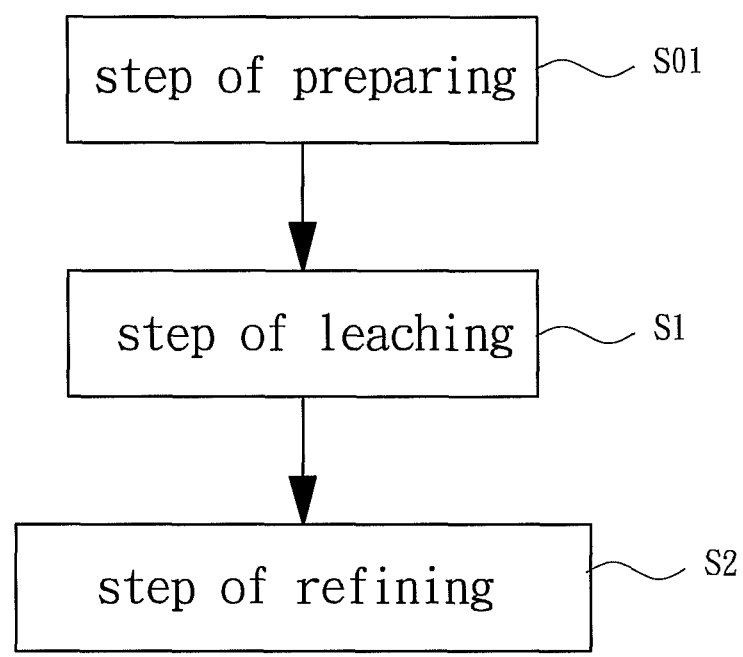
FIG. 3 is a diagram illustrating a second embodiment of a method for recycling metals from waste molybdic catalysts in the present invention.

Additionally, in accordance with FIG. 3, a second embodiment of a method for recycling metals from waste molybdic catalysts in the present invention comprises a step of "preparing S01" before the step of "leaching S1," and in which heavy oil remained on the waste molybdic catalyst is removed, in order to avoid the potential interference caused by the heavy oil. More precisely, the waste RDS catalyst is placed into a reactor under 150-800° C. to remove the heavy oil from the waste RDS catalyst. With such arrangement, the negative effects of the heavy oil on the step of "leaching S1" will be avoided, so as to promote the recycling rate of metals from the waste molybdic catalyst. Additionally, an assist acid can be further provided and used in the step of "leaching S1," with the assist acid advancing the acidity of the acid, so that the dissolution rate of metals in the acid can be significantly promoted. In the present invention, the assist acid can be hydrochloric acid, sulfuric acid or other strong acids, preferably at a concentration of 1-50% in the acid.

Through the present invention, the method for recycling metals from waste catalysts is provided, by soaking waste RDS catalysts in acid, with the high oxidation of the acid directly reacting with sulfur in the waste RDS catalysts to produce sulfide and vaporizer; further oxidizing metals in the waste RDS catalysts, such as vanadium, molybdenum, nickel and aluminum; and extracting metallic oxides, such as vanadium oxide and molybdenum oxide from the waste RDS catalysts. Wherein, the vaporizer obtained from the present invention is able to be converted to acid and recycled in the step of "leaching S1" of the present invention, not only can maintain the acidity of the acid, but also can advance the dissolution rate of metals from the waste RDS catalyst in the acid. Furthermore, the sulfide obtained from the present invention is in oxidization state and has higher vaporization point, and which is uneasy to diffuse through the processes of the next step of "refining S2". Hence, the ecological crisis and potential pollutions caused by contamination of vapored sulfide will be successfully avoided.

In additional, metals of the waste RDS catalyst are oxidized into metallic oxides in the present invention, so that those metals are easier to be extracted whatever from the first solution or solid dregs. As regard the high temperature for recycling vanadium, molybdenum, aluminum and nickel from the waste RDS catalysts in the conventional arts (more than 850° C. for example), it is no longer needed. Therefore, the method for recycling metals from waste molybdic catalysts of the present invention is sufficient to recycle metals with high quality and efficiency in a cost-and-time saving process.

In order to verify the benefits of the method for recycling metals from waste molybdic catalysts in the present invention, waste RDS catalyst and nitric acid are prepared to carry out the steps of "leaching S1" and "refining S2" of the present invention sequentially. In the following paragraphs, the recycling rate of vanadium, molybdenum, nickel and aluminum from the waste RDS catalyst is demonstrated under various conditions of processes, such as with different weight ratio of the nitric acid and the waste RDS catalyst, with different concentration of the nitric acid, and with/without assist acid (hydrochloride acid for example).

In TABLE 1, 1000 grams of waste RDS catalyst are soaked into 20% of nitric acid for 4 hours, with the weight ratio of the nitric acid and the waste RDS catalyst being 1, 2, 3, or 4 respectively, to extract metals, including vanadium, molybdenum, nickel and aluminum, from the waste RDS catalyst, and then the contents of residues obtained after the extracting are analyzed and listed.

TABLE 1

Contents of Residues under Various Ratio of RDS and Nitric Acid

| | Ratio of RDS and Nitric Acid | | | |
| --- | --- | --- | --- | --- |
| | 1:1 | 2:1 | 3:1 | 4:1 |
| Aluminum (g) | 221.6 | 215.8 | 213.3 | 213.6 |
| Molybdenum (g) | 3.5 | 0.32 | 0.03 | 0.03 |
| Nickel (g) | 3.3 | 0.22 | 0.02 | 0.02 |
| Vanadium (g) | 9.3 | 0.6 | 0.07 | 0.06 |

As it is shown in TABLE 1, it is note that vanadium, molybdenum, nickel and aluminum, are all recycled in a superior efficiency in the present invention, with a recycling rate even more than 99%, when the waste RDS catalyst is soaked into at least 2 times weights of nitric acid.

In TABLE 2, 1000 grams of waste RDS catalyst are soaked into 5%, 10%, 20%, 30%, or 40% of nitric acid respectively for 4 hours, with the ratio of the nitric acid and the waste RDS catalyst being 3, to extract metals, including vanadium, molybdenum, nickel and aluminum, from the waste RDS catalyst, and then the contents of residue obtained after the extracting are analyzed and listed.

TABLE 2

Contents of Residues under Various Concentration of Nitric Acid

| | Concentration of Nitric Acid (%) | | | | |
|---|---|---|---|---|---|
| | 5 | 10 | 20 | 30 | 40 |
| Aluminum (g) | 222.1 | 217.9 | 217.1 | 213.3 | 213.1 |
| Molybdenum (g) | 5.7 | 0.31 | 0.1 | 0.03 | 0.03 |
| Nickel (g) | 5 | 0.25 | 0.22 | 0.02 | 0.02 |
| Vanadium (g) | 8.9 | 0.71 | 0.5 | 0.07 | 0.06 |

Referring to TABLE 2, it is shown that vanadium, molybdenum, nickel and aluminum are all recycled in a superior efficiency in the present invention, with a recycling rate even more than 99%, as the waste RDS catalyst is soaked into 10%-40% of nitric acid.

According to data in TABLEs 1 and 2, it is proved that with the performance of the nitric acid in the present invention, the recycling rate of metals, such as vanadium, molybdenum, and nickel from the waste RDS catalyst can be promoted, but the cost for recycling metals from the waste RDS catalyst will be reduced. On the other hand, in TABLEs 1 and 2, the residues obtained after the extracting has 90-95% of aluminum. It is suggested that the recycled vanadium, molybdenum and nickel will not be contaminated by aluminum, so that the quality of the recycled vanadium, molybdenum and nickel is successfully maintained. Also, the residues contain less than 2% of sulfur. It is believed that sulfur in the waste RDS catalyst are converted into sulfuric acid, and mixed up with the acid.

In TABLE 3, 1000 grains of waste RDS catalyst are soaked into 20% of nitric acid and 0, 1%, 10%, 25%, or 50% of hydrochloric acid respectively for 4 hours, with the ratio of the nitric acid and the waste RDS catalyst being 3, to extract metals, including vanadium, molybdenum, nickel and aluminum, from the waste RDS catalyst, and then the recycling rate of vanadium, molybdenum, nickel and aluminum are analyzed and summarized individually.

TABLE 3

Recycling Rate of Metals under Various Concentration of HCl

| | Concentration of Hydrochloric Acid (%) | | | | |
|---|---|---|---|---|---|
| | 0 | 1 | 10 | 25 | 50 |
| Aluminum (g) | 5 | 5.2 | 5.5 | 5.5 | 6.1 |
| Molybdenum (g) | 70 | 72 | 74 | 74.3 | 75.1 |
| Nickel (g) | 93 | 93.2 | 95 | 95.5 | 96.5 |
| Vanadium (g) | 85 | 85.5 | 87 | 87.2 | 88.2 |

According to TABLE 3, with the performance of the hydrochloric acid and nitric acid, vanadium, molybdenum and nickel are all recycled in high efficiency. It is suggested that the assist acid, for example hydrochloric acid, sulfuric acid or other strong acids, is capable of promoting the recycling rate of vanadium, molybdenum and nickel from the waste RDS catalyst in the present invention.

To further prove that the method for recycling metals from waste molybdic catalysts of the present invention is capable of being used to recycle various metals from various waste catalysts, HDS waste catalyst and nitric acid are prepared to carry out the steps of "leaching S1" and "refining S2" of the present invention sequentially. In the present embodiment, the HDS waste catalyst comprises 30.1% of aluminum, 16.1% of molybdenum, 3.5% of nickel, and sulfur or sulfide obtained from the hydro-desulphurisation. In the following paragraphs, the recycling rate of molybdenum, nickel and aluminum from the HDS waste catalyst is demonstrated under various conditions of processes, such as with different weight ratio of the nitric acid and the HDS waste catalyst, with different concentration of the nitric acid, and with/without assist acid (hydrochloride acid for example).

In TABLE 4, 1000 grams of HDS waste catalyst are soaked into 20% of nitric acid for 4 hours, with the weight ratio of the nitric acid and the HDS waste catalyst being 1, 2, 3, or 4 respectively to extract metals, including molybdenum, nickel and aluminum, from the HDS waste catalyst, and then the contents of residues obtained after the extracting are analyzed and listed.

TABLE 4

Contents of Residues under Various Ratio of RDS and Nitric Acid

| | Ratio of RDS and Nitric Acid | | | |
|---|---|---|---|---|
| | 1:1 | 2:1 | 3:1 | 4:1 |
| Aluminum (g) | 291.1 | 288.5 | 285.9 | 285 |
| Molybdenum (g) | 18.9 | 1.59 | 0.15 | 0.15 |
| Nickel (g) | 4.7 | 0.34 | 0.03 | 0.03 |

As it is shown in TABLE 4, it is note that molybdenum, nickel and aluminum are all recycled in a superior efficiency in the present invention, with a recycling rate even more than 99%, when the HDS waste catalyst is soaked into at least 2 times weights of nitric acid.

In TABLE 5, 1000 grams of HDS waste catalyst are soaked into 5%, 10%, 20%, 30%, or 40% of nitric acid respectively for 4 hours, with the ratio of the nitric acid and the HDS waste catalyst being 3 to extract metals, including molybdenum, nickel and aluminum, from the HDS waste catalyst, and then the contents of residue obtained after the extracting are analyzed and listed.

TABLE 5

Contents of Residues under Various Concentration of Nitric Acid

| | Concentration of Nitric Acid (%) | | | | |
|---|---|---|---|---|---|
| | 5 | 10 | 20 | 30 | 40 |
| Aluminum (g) | 292.1 | 287.9 | 287.1 | 285.9 | 263.1 |
| Molybdenum (g) | 25.7 | 1.6 | 1 | 0.1 | 0.11 |
| Nickel (g) | 6 | 0.3 | 0.21 | 0.03 | 0.02 |

Referring to TABLE 5, it is shown that molybdenum, nickel and aluminum are all recycled in a superior efficiency in the present invention, with a recycling rate even more than 99%, as the HDS waste catalyst is soaked into 10%-40% of nitric acid.

Hence, in accordance with data in TABLEs 1 and 2, it is validated that with the performance of nitric acid of the present invention, the recycling rate of molybdenum and nickel from the HDS waste catalyst is dramatically promoted.

In TABLE 6, 1000 grams of HDS waste catalyst are soaked into 20% of nitric acid and 0, 1%, 10%, 25%, or 50% of hydrochloric acid respectively for 4 hours, with the ratio of the nitric acid and the HDS waste catalyst being 3 to extract metals, including molybdenum, nickel and aluminum, from the HDS waste catalyst, and then the recycling rate of molybdenum, nickel and aluminum are analyzed and summarized individually.

TABLE 6

Recycling Rate of Metals under Various Concentration of HCl

| | Concentration of Hydrochloric Acid (%) | | | | |
|---|---|---|---|---|---|
| | 0 | 1 | 10 | 25 | 50 |
| Aluminum (g) | 4.4 | 5.1 | 5.6 | 5.5 | 6.0 |
| Molybdenum (g) | 72 | 72 | 75 | 75.1 | 76.1 |
| Nickel (g) | 90 | 91.2 | 95 | 95 | 96 |

According to TABLE 6, with the performance of the hydrochloric acid and nitric acid, molybdenum and nickel are all recycled in a higher efficiency. It is suggested that the assist acid, for example hydrochloric acid, sulfuric acid or other strong acids, is sufficient to advance the recycling rate of molybdenum and nickel from the HDS waste catalyst in the present invention.

In summary, with the method for recycling metals from waste molybdic catalysts in the present invention, it is beneficial to improve environmental pollutions on air or water resource caused by contamination of sulfur or sulfide, to simplify the process of recycling, and to reduce the use of acid during the cycling process, so as to obtain recycled metals in high efficiency and superior quality.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A method for recycling metals from waste molybdic catalysts, comprising steps of:
    leaching, by soaking a waste molybdic catalyst into a highly oxidized acid and conducting a reaction between sulfur in the waste molybdic catalyst and the highly oxidized acid to obtain sulfide and vaporizer, wherein metals in the waste molybdic catalyst are dissolved and oxidized by the highly oxidized acid to obtain a first solution and dregs; and
    refining, by further dissolving metals in the dregs into a second solution, and extracting metals in the waste molybdic catalyst from the first and second solution;
    wherein the vaporizer obtained from the step of leaching is converted into the highly oxidized acid and recycled in the step of leaching;
    wherein the highly oxidized acid is selected from the group consisting of nitric acid, nitrous acid, hypochlorous acid, chlorous acid and perchloride acid.

2. The method for recycling metals from waste molybdic catalysts as defined in claim 1, wherein, an assist acid, being a strong acid, is further added into the highly oxidized acid in the step of leaching.

3. The method for recycling metals from waste molybdic catalysts as defined in claim 2, with the concentration of the assist acid in the highly oxidized acid being set up at 1 wt % to 50 wt %.

4. The method for recycling metalS from waste molybdic catalysts as defined in claim 2, wherein the step of refining further comprises substeps of:
    extracting, by extracting metals of waste molybdic catalyst from the first solution; and
    roasting, by roasting the dregs till ripening, soaking the dregs into water to dissolve metals of the dregs and to obtain the second solution, and extracting metals of waste molybdic catalyst from the second solution.

5. The method for recycling metals from waste molybdic catalysts as defined in claim 2, wherein a step of preparing is performed before the step of leaching to remove heavy oil from the waste molybdic catalyst.

6. The method for recycling metals from waste molybdic catalysts as defined in claim 1, with a weight ratio between the highly oxidized acid and the waste molybdic catalyst being set up at 1 to 4.

7. The method for recycling metals from waste molybdic catalysts as defined in claim 1, with the concentration of the highly oxidized acid being set up at 5 wt % to 40 wt %.

8. The method for recycling metals from waste molybdic catalysts as defined in claim 1, wherein the waste molybdic catalyst is waste RDS (residual desulfurization) catalyst, and the waste RDS (residual desulfurization) catalyst is rich in vanadium, molybdenum, nickel and aluminum.

9. The method for recycling metals from waste molybdic catalysts as defined in claim 1, wherein the waste molybdic catalyst is waste HDS (hvdrodesulfurization) catalyst, and the waste HDS (hydrodesulfurization) catalyst is rich in molybdenum, nickel and aluminum.

10. The method for recycling metals from waste molybdic catalysts as defined in claim 1, wherein the waste molybdic catalyst is a mix of waste RDS (residual desulfurization) catalyst and waste HDS (hydrodesulfurization) catalyst, and the mix of waste RDS (residual desulfurization) catalyst and waste HDS (hydrodesulfurization) catalyst is rich in vanadium, molybdenum, nickel and aluminum.

11. The method for recycling metals from waste molybdic catalysts as defined in claim 1, wherein the step of refining further comprises substeps of:
    extracting, by extracting metals of waste molybdic catalyst from the first solution; and
    roasting, by roasting the dregs till ripening, soaking the dregs into water to dissolve metals of the dregs and to obtain the second solution, and extracting metals of waste molybdic catalyst from the second solution.

12. The method for recycling metals from waste molybdic catalysts as defined in claim 11, wherein, an extraction solvent, an alkaline solvent and an acid solvent are provided and used in the substep of extracting, with a performance of the extraction solvent to extract metals of the waste molybdic catalyst from the first solution and to obtain an extract, with a performance of the alkaline solvent or the acid solvent to further extract metals of the waste molybdic catalyst from the extract and to obtain another extract, and finally to recycle metals of the waste molybdic catalyst from the another extract.

13. The method for recycling metals from waste molybdic catalysts as defined in claim 12 wherein the alkaline solvent is sodium hydroxide, sodium chloride, sodium carbonate or ammonia, and the acid solvent is sulfuric acid, hydrochloric acid or phosphoric acid.

14. The method for recycling metals from waste molybdic catalysts as defined in claim 11, wherein, in the substep of roasting, alkaline powders and the dregs are mixed and roasted till ripening, followed by soaking the ripened dregs into hot water to obtain the second solution, to recycle metals of waste molybdic catalyst from the second solution according to the processes in the substep of extracting.

15. The method for recycling metals from waste molybdic catalysts as defined in claim 14, with the temperature of the substep of roasting being set up at 300° C. to 800° C.

16. The method for recycling metals from waste molybdic catalysts as defined in claim 14, wherein the alkaline powders is sodium carbonate, sodium hydroxide or sodium chloride.

17. The method for recycling metals from waste molybdic catalysts as defined in claim 1, wherein a step of preparing is performed before the step of leaching to remove heavy oil from the waste molybdic catalyst.

\* \* \* \* \*